United States Patent
May

(10) Patent No.: US 9,134,188 B2
(45) Date of Patent: *Sep. 15, 2015

(54) ACTIVE MECHANICAL FORCE SENSOR

(71) Applicant: PolyResearch AG, Chur (CH)

(72) Inventor: Lutz May, Berg (DE)

(73) Assignee: PolyResearch AG, Chur (CH)

( * ) Notice: Subject to any disclaimer, the term of this patent is extended or adjusted under 35 U.S.C. 154(b) by 184 days.

This patent is subject to a terminal disclaimer.

(21) Appl. No.: 13/709,889

(22) Filed: Dec. 10, 2012

(65) Prior Publication Data

US 2014/0020481 A1  Jan. 23, 2014

(30) Foreign Application Priority Data

Dec. 8, 2011 (EP) ..................................... 11192656
Dec. 22, 2011 (EP) ..................................... 11195273

(51) Int. Cl.
 *G01L 1/12* (2006.01)

(52) U.S. Cl.
 CPC . *G01L 1/12* (2013.01); *G01L 1/127* (2013.01); *G01L 1/125* (2013.01)

(58) Field of Classification Search
 CPC ......... G01L 3/101; G01L 3/102; G01L 3/104; G01L 3/105; G01L 3/109; G01L 1/12; G01L 1/125
 USPC .......................... 73/862.331–862.336, 862.69
 See application file for complete search history.

(56) References Cited

U.S. PATENT DOCUMENTS

| | | | | |
|---|---|---|---|---|
| 2,912,642 A | * | 11/1959 | Dahle | ........................... 324/209 |
| 4,589,290 A | * | 5/1986 | Sugiyama et al. | ....... 73/862.333 |
| 4,590,807 A | * | 5/1986 | Kobayashi et al. | ...... 73/862.336 |
| 4,627,298 A | * | 12/1986 | Sahashi et al. | ........... 73/862.336 |
| 4,762,008 A | * | 8/1988 | Kobayashi et al. | ...... 73/862.336 |
| 4,803,885 A | | 2/1989 | Nonomura et al. | |
| 4,805,466 A | * | 2/1989 | Schiessle et al. | ........ 73/862.336 |
| 4,811,609 A | * | 3/1989 | Nishibe et al. | ........... 73/862.333 |
| RE34,039 E | * | 8/1992 | Kobayashi et al. | ...... 73/862.336 |
| 6,581,480 B1 | * | 6/2003 | May et al. | ................. 73/862.333 |
| 6,997,065 B2 | * | 2/2006 | May | ......................... 73/862.331 |
| 7,302,867 B2 | * | 12/2007 | May | ......................... 73/862.331 |
| 7,661,324 B2 | * | 2/2010 | Harata et al. | ............. 73/862.333 |
| 8,058,865 B2 | * | 11/2011 | May | ......................... 324/207.16 |

(Continued)

FOREIGN PATENT DOCUMENTS

| WO | 01/79801 | 10/2001 |
|---|---|---|
| WO | 02/23146 | 3/2002 |

*Primary Examiner* — Lisa Caputo
*Assistant Examiner* — Jonathan Dunlap
(74) *Attorney, Agent, or Firm* — Fay Kaplun & Marcin, LLP

(57) ABSTRACT

A contactless force measurement sensor for measuring an applied force onto an object is provided. The contactless force measurement sensor includes a first facing orientation which facing orientation defines an orientation pointing towards a surface of the object, a first magnetic field generating unit being adapted for generating a magnetic field towards the facing orientation, a first magnetic field detector unit being adapted for detecting a first magnetic field which field being generated by the first magnetic field generating unit and being influenced by an applied force to be measured, wherein the first magnetic field detector unit is further adapted for outputting a first signal being representative for the detected magnetic field, and an evaluating unit being adapted for evaluating a signal strength of the first signal and determining the applied force based on the first signal.

9 Claims, 9 Drawing Sheets

(56) References Cited

U.S. PATENT DOCUMENTS

| | | | |
|---|---|---|---|
| 8,181,493 B2* | 5/2012 | May | 68/12.27 |
| 2005/0061088 A1* | 3/2005 | May | 73/862.331 |
| 2005/0061089 A1* | 3/2005 | May | 73/862.331 |
| 2008/0314163 A1* | 12/2008 | Harata et al. | 73/862.333 |
| 2008/0315870 A1* | 12/2008 | May | 324/239 |
| 2009/0007697 A1* | 1/2009 | May | 73/862.333 |
| 2009/0217711 A1* | 9/2009 | May | 68/12.04 |
| 2011/0308330 A1* | 12/2011 | May | 73/862.69 |
| 2014/0184210 A1* | 7/2014 | Campbell et al. | 324/209 |

* cited by examiner

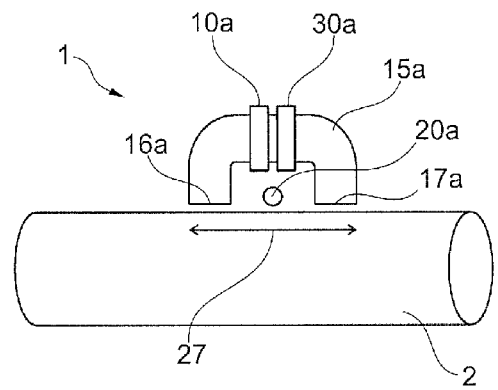
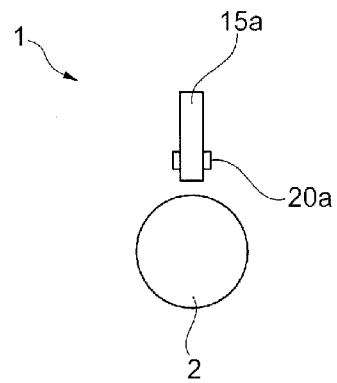
Fig. 9A          Fig. 9B
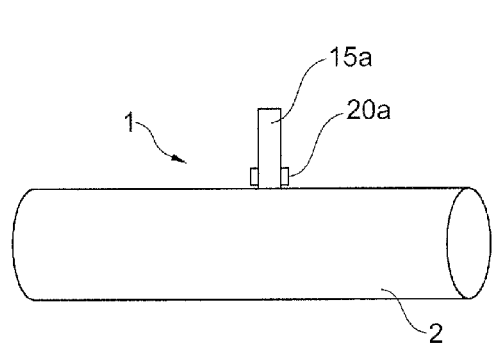
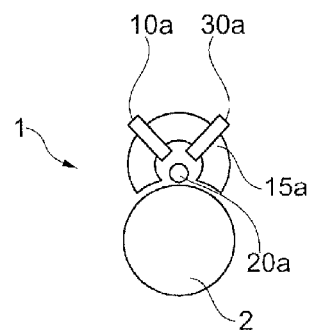
Fig. 10A         Fig. 10B

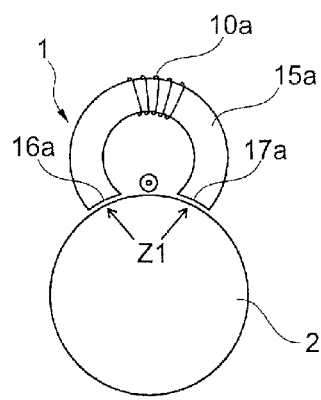
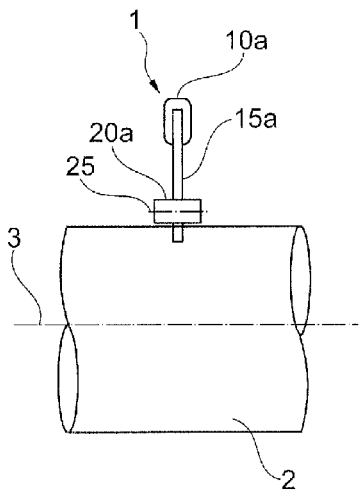
Fig. 14     Fig. 15
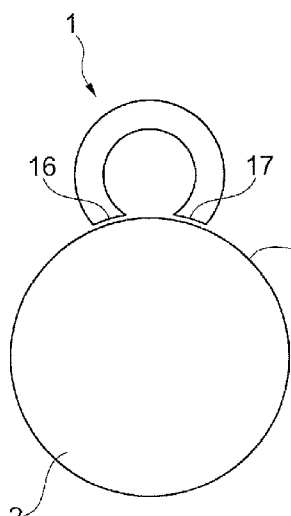
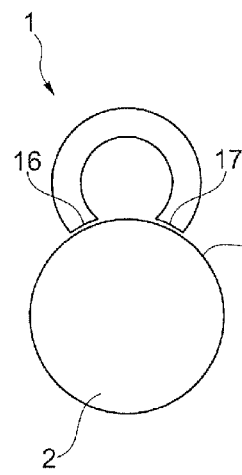
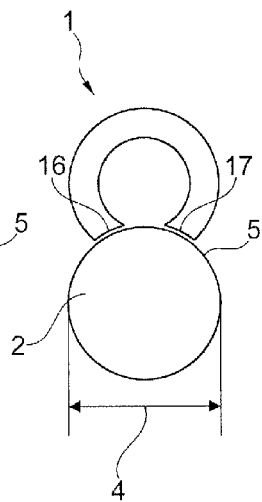
Fig. 16A     Fig. 16B     Fig. 16C

ACTIVE MECHANICAL FORCE SENSOR

FIELD OF THE INVENTION

The present invention relates to a contactless force measurement sensor and to a sensing arrangement having such a contactless force measurement sensor for measuring an applied force onto an object.

TECHNICAL BACKGROUND

Force measurement is important for many industrial applications, in particular for arrangements being dynamically impacted by a force. Applied forces may be pressuring forces as well as moments like torque and bending impact. An exemplary application for torque is a shaft for a vehicle being arranged between a motor and e.g. a wheel. For determining a torque in the shaft, either a particular element may need to be mounted to the shaft, or the shaft may need to be pre-processed, e.g. magnetized. Mounting elements to a shaft may influence the movement of the shaft, pre-processing may be difficult when the shaft is not accessible or cannot be dismounted for pre-processing.

In industry applications and laboratory research and development applications, strain gauge sensors are used to measure bending forces. There are only a few other alternative sensor solutions available that may provide adequate bending sensor performance and are suitable for environmental conditions typical for the automotive, industrial, and consumer market.

SUMMARY OF THE INVENTION

It is an object of the invention to provide a contactless force measurement sensor for measuring a bending force in a longitudinal object.

The object is solved by the subject matter of the independent claims. Further embodiments are incorporated in the dependent claims and in the following description.

According to an aspect of the invention, a contactless force measurement sensor for measuring an applied force onto an object is provided, wherein the contactless force measurement sensor comprises a first facing orientation which defines an orientation pointing towards a surface of the object, a first magnetic field generating unit being adapted for generating a magnetic field towards the facing orientation, a first magnetic field detector unit being adapted for detecting a first magnetic field which field being generated by the first magnetic field generating unit and being influenced by an applied force to be measured, wherein the first magnetic field detector unit is further adapted for outputting a first signal being representative for the detected magnetic field, and an evaluating unit being adapted for evaluating a signal strength of the first signal and determining the applied force based on the first signal.

The contactless force measurement sensor as described above and hereinafter is about a magnetic principle mechanical force sensor design that can detect and quantify mechanical forces from ferromagnetic metallic objects, like a transmission shaft, screw driver shaft, torque wrenches, and power-tool drilling shaft, for example.

The contactless force measurement sensor may in particular be adapted to detect torque, pressure and tensile or pulling forces.

The first magnetic field generating unit may in particular be a coil applied with a signal in form of alternating current for generating a magnetic field. The contactless force measurement sensor may comprise a flux concentrator, wherein the first magnetic field generating unit may be wound around the flux concentrator, such that the flux concentrator directs the magnetic field lines of the magnetic field generated by the first magnetic field generating unit along the first facing orientation towards the surface of the object to be sensed.

The first magnetic field detector unit may in particular be a coil adapted for generating a current when being applied to the magnetic field lines of the magnetic field generated by the first magnetic field generating unit. The magnetic field lines induce a current to the first magnetic field detector unit.

The direction and strength of the magnetic field lines may vary dependent on an applied force to the object to be sensed. Thus, the current induced to the first magnetic field detector unit corresponds to the first signal which may vary dependent on the mechanical forces applied to the object to be sensed, wherein the current is a scale for the mechanical forces applied to the object to be sensed.

The features of the contactless force measurement sensor as described above and hereinafter may be the follows: non-contact or contactless sensing principle; using magnetic principles for force measurement; being insensitive or substantially insensitive to magnetic fields that are already present or stored in the object to be sensed; no necessity for treating the object to be sensed in whatever way; no degradation of the sensor performance over time as it is an active sensing principle; measuring in differential mode; sensitivity to a single axis bending force may be realized (no cross talk between bending forces in different directions); may works on objects to be sensed that are static or that rotate at any speed; insensitivity to light, dust, mechanical shocks, water, humidity, oil, for example; works with any object containing metallic material as long as it attracts a magnet and conducts magnetic flux lines; may tolerate an air gap or spacing between the object to be sensed and the contactless force measurement sensor; may be applied to objects with varying dimensions (shaft diameter, for example); the temperature operating range may be from −50° C. to more than 210° C.

Active magnetic principle mechanical force sensor means that there will be no need for a "permanent" magnetization of the object to be sensed to make the sensor work. An active mechanical force sensor can function immediately after placing the sensor hardware appropriately close to the test object or object to be sensed.

The contactless force measurement sensor may not need to be physically attached to the object to be sensed. There can be a gap of a few millimeters between the sensor and the object to be sensed and it will still work. Therefore this sensor works whatever the object to be sensed surface may be (coated, painted, dusty, for example), which may be ideal for measuring on construction sites, bridges, cranes, building frame works.

The contactless force measurement sensor works with any metallic material or object to be sensed material containing metallic material as long as the magnetic properties of the material are sufficient to attract and/or hold a permanent magnet. This may apply to only a limited degree or substantially not to sintered materials as they may be too brittle when bending forces are applied.

In other words, the first magnetic field generating unit generates a magnetic field whose field lines spread towards the object to be sensed. The first magnetic field detector unit detects the magnetic field lines and in particular the spread, distracted, or diverged magnetic field lines, wherein the spreading and diverging of the magnetic field lines is influenced by a force applied to the object to be sensed such that the current induced to the first magnetic field detector unit varies dependent on the spread, distracted, and diverged magnetic field lines.

According to an embodiment of the invention, the contactless force measurement sensor further comprises a second facing orientation pointing towards the surface of the object, a second magnetic field generating unit being adapted for generating a magnetic field towards the second facing orientation, a second magnetic field detector unit being adapted for detecting a magnetic field which field being generated by the second field generator unit and being influenced by an applied force to be measured, wherein the second magnetic field detector unit is further adapted for outputting a second signal being representative for the detected magnetic field, wherein the evaluating unit is being adapted for evaluating a signal strength of the first signal and the second signal and determining the applied force based on the first signal and the second signal.

The second magnetic field generating unit and the second magnetic field detector unit may be arranged similar to the first magnetic field generating unit and the first magnetic field detector unit, respectively, with respect to each other and with respect to the object to be sensed.

Thus, the explanations and elucidations with regard to the first magnetic field generating unit and first magnetic field detector unit (which may be referred to as a first sensing unit) apply in an analog manner to the second magnetic field generating unit and to the second magnetic field detector unit (which may be referred to as a second sensing unit).

The first sensing unit and the second sensing unit may be used for providing measurement redundancy and avoiding or minimizing errors in measurement.

In case the object to be sensed is a longitudinal object, the first sensing unit and the second sensing unit may be arranged in longitudinal direction of the object to be sensed opposite to each other, i.e. an angle between the first facing orientation and the second facing orientation is 180°.

In an alternative embodiment, the angle between the first facing orientation and the second facing orientation may be 90° or any angle between 0° and 180°.

Arranging the first sensing unit and the second sensing unit in the longitudinal direction of the object to be sensed opposite to each other means that the first sensing unit and the second sensing unit do not have a lateral offset in direction of the longitudinal direction of the object to be sensed.

However, in an alternative embodiment, the first sensing unit and the second sensing unit may be arranged with respect to the object to be sensed such that they have a lateral offset with respect to each other.

According to a further embodiment of the invention, the evaluating unit is being adapted for determining the applied force based on a difference between the first signal and the second signal.

The force may in particular be applied in one specific axis in relation to the object, for example perpendicular to a longitudinal direction of the object.

The first and second contactless force measurement sensor may be arranged opposite to each other, i.e. directed towards each other, such that the object to be sensed may be arranged in between the first and second contactless force measurement sensor.

Thus, a bending force applied to an object to be sensed is being measured as the first contactless force measurement sensor may measure a compressive force and the second contactless force measurement sensor may measure the corresponding tensile force at the opposite side of the object to be sensed.

The first and second contactless force measurement sensors may be arranged such that the bending axis is perpendicular to a connecting line or orthogonal to an extension plane between the contactless force measurement sensors. Thus, a bending direction is directed away from one of the first and second contactless force measurement sensor and towards the other one of the first and second contactless force measurement sensor.

According to a further embodiment of the invention, at least one of the first magnetic field generating unit and the second magnetic field generating unit comprises a magnetic field generating element and a flux concentrator, wherein the flux concentrator cooperates with the magnetic field generating element so as to concentrate the generated magnetic field towards the facing orientation.

The magnetic field generating element may comprise one coil or a multitude of coils which are adapted to generate a magnetic field when applying an electric current to the coil or coils.

The flux concentrator is being adapted to concentrate the magnetic field or the magnetic field lines generated by the magnetic field generating element.

According to a further embodiment, the flux concentrator is of a U-shape, in particular of a horseshoe shape and having two poles, wherein both poles are oriented into the facing orientation. The flux concentrator may further be of a U-round or C-shape or of a square-shape with one opened side, the flux concentrator being of almost any dimensional ratio.

The flux concentrator may be of a C-shape or any other circular arc shape, wherein the first pole and the second pole are arranged at the two ends of the flux concentrator. The first pole and the second pole may be adapted and formed to correspond to a surface of the object to be sensed. Thus, a surface of the first pole and of the second pole may be inclined with respect to the flux concentrator or may be a curved, arched, or bent surface.

As the flux concentrator is circular arc shaped, both the first pole and the second pole are directed towards the surface of the object to be sensed and thus direct the magnetic flux lines towards and through the object to be sensed.

According to a further embodiment of the invention, at least one of the first magnetic field detector unit and of the second magnetic field detecting unit comprises a coil which is located between the first pole and the second pole.

The coil is arranged for detecting the magnetic field lines of the magnetic field generated by the first magnetic field generating unit and the second magnetic field generating unit. The magnetic conductivity of the object to be sensed may vary dependent on an applied force to the object to be sensed such that the magnetic field strength detected by the first magnetic field detector unit and the second magnetic field detector unit and in particular by the coil of the detector units varies.

As the coil is arranged in between the first pole and the second pole, the coil may optimally detect the changed magnetic conductivity which leads to a changed magnetic field strength between the poles, as the magnetic field may be distracted by the object to be sensed in case the object to be sensed is subjected to a mechanical force.

In an alternative embodiment, the coil of the first magnetic field detector unit and of the second magnetic field detector unit comprises a central axis, which central axis may coincide with a connecting line between the first pole and the second pole.

In another alternative embodiment, the central axis of the coil of the detector units may be arranged diagonal or inclined with respect to the connecting line between the first pole and the second pole.

An alternated angle between the central axis of the coil of the detector units and the connecting line of the first and second pole may influence the sensitivity of the coil to an altered magnetic field strength and thus vary the measurement range or signal range of the first signal indicating the force to be measured.

According to a further embodiment, the coil, and in particular a central or longitudinal axis of the coil of the detector units is oriented into a direction corresponding to a connection line between the first pole and the second pole.

Thus, the longitudinal axis of the coil of the detector units may be arranged parallel to the connecting line or may coincide with the connecting line.

According to a further embodiment of the invention, the coil is offset to a connection line between the both first pole and the second pole.

In other words, the longitudinal axis of the coil of the detector units and the connecting line are parallel to each other and comprise a predetermined distance with respect to each other.

A coil with a lateral offset to the connecting line between the two poles of the flux concentrator may support the adjustment of the measurement range and may support the consideration of magnetic properties of the material of the object to be sensed. In particular when used in connection with a rotating object to be sensed, the coil of the detector units may have a lateral offset with regard to the connecting line between the poles of the flux concentrator in a direction of the rotation of the object to be sensed along the surface of the object to be sensed.

According to a further embodiment, the contactless force measurement sensor further comprises at least one feedback element being connected to the evaluation unit and being adapted to provide a comparative signal, based on which the evaluation unit compensates a varying distance between the contactless force measurement sensor and the object.

The feedback element may in particular provide the magnetic field strength of the magnetic field conducted through the flux concentrator. This signal is substantially independent of the distance to an object to be sensed.

The magnetic field and the strength of the magnetic field lines conducted from the two poles through the material of the object to be sensed may vary with a varied distance of the contactless force measurement sensor and in particular of the flux concentrator from the surface of the object to be sensed, which may influence the measured value of the first signal.

In order to consider the distance between the flux concentrator and the surface of the object to be sensed and not measuring incorrect values of the applied mechanical force, the feedback element provides a reference value which is to be assessed in relation to the signal detected by the first magnetic field detector unit and second magnetic field detector unit.

According to a further embodiment of the invention, the feedback element is a coil wound around the flux concentrator.

According to a farther element of the invention, at least one of the first magnetic field generating unit and second magnetic field generating unit is adapted for generating a magnetic field being a combination of a permanent magnetic field and a magnetic field having an alternating frequency.

Thus, the effect of a magnetic field caused by external influence may be detected, which may deviate from the frequency of the magnetic field generated by the first magnetic field generating unit and the second magnetic field generating unit.

According to a further embodiment of the invention, at least one of the first magnetic field generating unit and second magnetic field generating unit is adapted for adopting a frequency of the generated magnetic field.

According to a further embodiment of the invention, the second facing orientation oppositely faces the first facing orientation, having a distance between the first magnetic field generating unit and the first magnetic field sensing unit on the one hand and the second magnetic field generating unit and the second magnetic field sensing unit on the other hand for receiving an object onto which an applied force is to be measured.

The distance between the first sensing unit and the second sensing unit may correspond to a width or a diameter of the object to be sensed or may be greater than the width or the diameter of the object to be sensed. In the latter case, at least one of the first sensing unit and the second sensing unit is arranged distant to the surface of the object to be sensed and there is a gap between the surface of the object to be sensed and the at least one of the first sensing unit and the second sensing unit arranged distant to the surface of the object to be sensed.

In an alternative embodiment, the first sensing unit and the second sensing unit may be arranged equidistant to the surface of the object to be sensed, wherein the first sensing unit and the second sensing unit each are spaced apart from the object to be sensed and in particular from the surface of the object to be sensed in different directions, i.e. along the first facing orientation and second facing orientation, respectively.

According to a further embodiment of the invention, the distance between the first sensing unit and the second sensing unit is adapted so as to receive an elongated object.

The object to be sensed may be a prismatic, cylindrical, or conical elongated object, in particular a shaft in a rotating or static state which is adapted to be subjected to a mechanical force.

The first pole and the second pole of the flux concentrator of each the first sensing unit and the second sensing unit may be arranged such that the distance of the first pole and the second pole to the surface of the object to be sensed is the same or different.

According to a further embodiment of the invention, the contactless force measurement sensor is adapted for measuring bending forces, wherein the evaluation unit is adapted for evaluating the first and second signal and to determine a bending force based on the first and second signal.

According to a further aspect of the invention, a sensing arrangement is provided having a contactless force measurement sensor as described above and hereinafter and an elongated object, wherein a longitudinal extension of the first magnetic field generating unit is substantially parallel with a longitudinal extension of the elongated object.

The longitudinal extension of the first magnetic field generating unit corresponds to the connecting line between the first pole and the second pole of the flux concentrator.

According to a further embodiment, the connecting line of the first magnetic field generating unit and the connecting line of the second magnetic field generating unit are arranged parallel to each other which means that a longitudinal extension of the second magnetic field generating unit is substantially parallel with the longitudinal extension of the elongated object to be sensed.

According to a further embodiment, the connecting line of the first magnetic field generating unit and the connecting line of the second magnetic field generating unit are arranged inclined to each other. Thus, the longitudinal extension of one of the first magnetic field generating unit and the second magnetic field generating unit extends substantially parallel to the longitudinal direction or extension of the object to be sensed and the longitudinal extension of the other one of the first magnetic field generating unit and the second magnetic field generating unit is inclined with respect to the longitudinal extension of the object to be sensed.

According to a further aspect, a sensing arrangement is provided having a contactless force measurement sensor as described above and hereinafter and an elongated object, wherein a longitudinal extension of the first magnetic field generating unit is substantially traverse to a longitudinal extension of the elongated object.

The angle between the longitudinal extension of the first magnetic field generating unit and the longitudinal extension of the object to be sensed may be between 0° and 90°, wherein in a preferred embodiment the angle is 90° or substantially 90°.

With regard to the object to be sensed material, as long as a permanent magnet will stuck to the object to be sensed, then the contactless force measurement sensor as described above and hereinafter may be able to perform the intended force measurement. In order to achieve the best possible measurement signal quality, it may be advisable to harden the object to be sensed material, at least at the sensing region. "Sensing Region is the location where the contactless force measurement sensor will be placed. Failing to do so may result in a relative large measurement hysteresis.

A generator coil is driven by either a DC or a specific AC signal, and with this produces magnetic flux beneath the surface of the test object. The mechanical forces that travel through the test object will influence the direction the magnetic flux lines will take when trying to go from one to the other poles of the flux concentrator. The change in the travel direction of the magnetic flux lines can be detected by a magnetic field sensing device that is placed on or close to the surface of the test object. The signal changes picked up by the magnetic field sensing device are proportional to the targeted mechanical forces that are applied to the test object.

When using an electric DC current to drive the field generator coil, then there may be the risk of beginning to permanently magnetize a small section of the test object (material dependent). This may cause a signal offset that may look like a real signal caused by mechanical forces. This problem can be circumvented by using an electric AC driver signal to run the field generator. However, only very specific frequencies may be suitable to detect and measure mechanical forces from the test object.

When using test object materials that have ferromagnetic properties and can be permanently magnetized then this material may not be used in a DC driven contactless force measurement sensor. The reason is that this material will slowly but steadily become a bar magnet where the sensor is placed (meaning that the location where the sensor is placed will act like a magnet by itself after some time, which may be within a few seconds or a few minutes. When this happens, the signal offset of the sensor output may drift in one direction and may not be stable. In reverse, a DC operated sensor is very sensitive to magnetic fields that are stored beneath the surface of the test object. Before usage, the material of the test object has to be degaussed first.

When running the sensor in AC mode (i.e. the field generator coil is driven by a symmetrically alternating current at a certain frequency), and when using standard inductors with ferromagnetic core, then the sensor design may be in most cases insensitive to magnetic fields stored in the test object. "Most Cases" means that there are possible cases where the AC driven bending sensor will be sensitive to magnetic fields that are stored beneath the test object surface. Example: Assuming there is one magnetic spot stored in the test object (at the sensing region), and further assuming that there are two sensing coils placed symmetrically around the shaft, then, at a shaft rotational speed of 300 revolution per second (equivalent to 18.000 rpm) the signal generated by this magnetic spot will interfere with the sensor system internal signal decoding function.

The orientation of the sensing coil (in relation to the magnetic flux lines, generated by the generator coil and the flux concentrator) decides about what mechanical force will be detected and measured, and how large the measured signal will be (signal quality).

Traditional bending sensing technologies may require that the sensing element is firmly attached to the test object surface to assure that the mechanical forces of interest travel through it for measurement. The cable connections required (from and to the sensor element), the environmental limitations (humidity and thermal cycles will limit the life time of the sensing element), and the costs associated with these sensing technologies may limit their usage and may be prohibitive in volume applications.

The sensor as described above and hereinafter helps overcome these issues and can therefore being used widely in the markets: automotive, avionics, industry, consumer, and instrumentation, like: diagnostics and preventive care on large building structures (bridges, skyscrapers); real-time measurements in car/truck suspensions for active suspension or active stability control; avionics: wing loads at bad weather situations and diagnostics on the frame structure; consumer and professional tools: building torque wrenches (through bending forces); and tool overload detection; wind power: turbine structure and propeller structure when exposed to forces; industrial processing equipment like paper mills, steel production, and tooling equipment (detecting force limits to prevent damages for tools and materials.

With regard to the flux concentrator material, one criteria applied to decide about which washer or clip-ring material can be used is that the material shows a strong response to a permanent magnet held near it. The material may be for example higher grade materials, like transformer steel.

The washer and clip rings may have a suitable design that simplified the sensor design. Washers may be perfectly symmetrically shaped and may be available in almost all desired sizes and thickness at low cost.

The washers and clip rings may comprise different material (hardened spring steel, non-hardened washers, for example) and optionally a coating (chrome, zinc).

As the bending sensor can be run in a DC mode or in an AC mode, there are different material specification requirements for each of these two operation modes as well. When the chosen material has a high remanence then it may not be suitable for DC operation as the flux concentrator may show different reaction before and after it has been permanently magnetized. A suitable material choice may be transformer steel.

With regard to the object to be sensed material, this may be ferromagnetic material or normal steels which include nickel, chrome, or similar material, in single form or in some combinations. However, as long as a permanent magnet will stick to a test object then the bending sensor may function.

According to a further aspect, a method for measuring a bending force in a longitudinal object is provided, comprising the steps: providing a first contactless force measurement sensor and a second contactless force measurement sensor as described above and hereinafter, wherein the first contactless force measurement sensor and the second contactless force measurement sensor are arranged opposite to each other with respect to the longitudinal object; measuring a mechanical force applied to the surface of the longitudinal object with each the first contactless force measurement sensor and the second contactless force measurement sensor; providing the measured force signal to a calculating unit; subtracting the force signal provided by the first contactless force measurement sensor from the force signal provided by the second contactless force measurement sensor.

The difference between the force signal of the first contactless force measurement sensor and the force signal of the second contactless force measurement sensor corresponds to a bending force applied to the longitudinal object.

Arranging the first contactless force measurement sensor and the second contactless force measurement sensor means that the longitudinal object is arranged in between them and the first and second contactless force measurement sensors are directed towards each other, i.e. they are arranged with respect to each other at an angle of 180°.

According to an embodiment, the first and second contactless force measurement sensor do not have any lateral offset with regard to the longitudinal axis of the longitudinal object.

Exemplary embodiments of the invention will be described with reference to the following drawings.

BRIEF DESCRIPTION OF THE DRAWINGS

FIG. 9A illustrates a contactless force measurement sensor according to a further exemplary embodiment of the invention.

FIG. 9B illustrates a contactless force measurement sensor according to a further exemplary embodiment of the invention.

FIG. 10A illustrates a contactless force measurement sensor according to a further exemplary embodiment of the invention.

FIG. 10B illustrates a contactless force measurement sensor according to a further exemplary embodiment of the invention.

FIG. 14 illustrates a contactless force measurement sensor according to a further exemplary embodiment of the invention.

FIG. 15 illustrates a contactless force measurement sensor according to a further exemplary embodiment of the invention.

FIG. 16A schematically illustrates a contactless force measurement sensor according to a further exemplary embodiment of the invention.

FIG. 16B schematically illustrates a contactless force measurement sensor according to a further exemplary embodiment of the invention.

FIG. 16C schematically illustrates a contactless force measurement sensor according to a further exemplary embodiment of the invention.

DETAILED DESCRIPTION OF EMBODIMENTS

Figure 1:
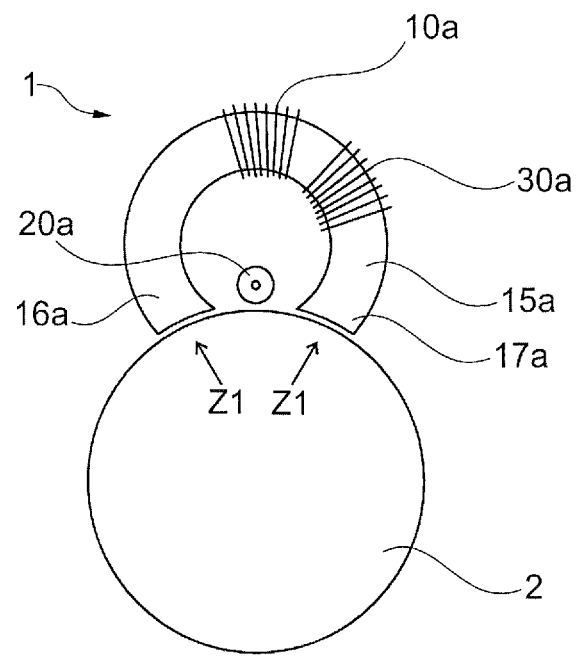
FIG. 1 illustrates a contactless force measurement sensor according to an exemplary embodiment of the invention.

FIG. 1 illustrates a contactless force measurement sensor 1 and a circular object to be sensed 2. The contactless force measurement sensor 1 comprises a flux concentrator 15a with a first magnetic field generating unit 10a and a feedback element 30a attached to the flux concentrator. The flux concentrator comprises a first pole 16a and a second pole 17a, wherein the first pole and the second pole are directed along the first facing orientation z1 towards a surface of the object to be sensed.

The flux concentrator is shaped in form of a C-shape or U-shape, and in particular in form of an arc of a circle. The surface of the first pole and of the second pole may be adapted to the surface of the object to be sensed, i.e. the surface of the poles is also circular shaped and in particular concave.

The first magnetic field generating unit 10a is driven with an alternating current and generates a magnetic field whose magnetic field lines are concentrated and directed towards the object to be sensed. The magnetic field lines spread through the object to be sensed from one of the poles to the other one of the poles, wherein the magnetic flux depends on a mechanical force applied to the object to be sensed 2.

The feedback element 30a is adapted to measure the magnetic field strength of the magnetic field flowing through the flux concentrator.

Between the first pole and the second pole, the first magnetic field detector unit 20a is arranged such that magnetic field lines between the first pole and the second pole lead to an induced current in the first magnetic field detector unit in form of a coil. As the magnetic field strength between the first pole and the second pole varies dependent on a mechanical force applied to the object to be sensed, the current induced into the first magnetic field detector unit varies and is a parameter for the mechanical force applied to the object to be sensed.

The first magnetic field detector unit is arranged such that a longitudinal axis of the first magnetic field detector unit extends parallel to a longitudinal axis of the object to be sensed and is inclined, in particular perpendicular, with respect to the connecting line between the first pole and the second pole.

In other words, the magnetic field lines from one of the first pole and the second pole to the other one of the first pole and the second pole pass the object to be sensed in a direction perpendicular to the longitudinal axis of the object to be sensed.

Figure 2:
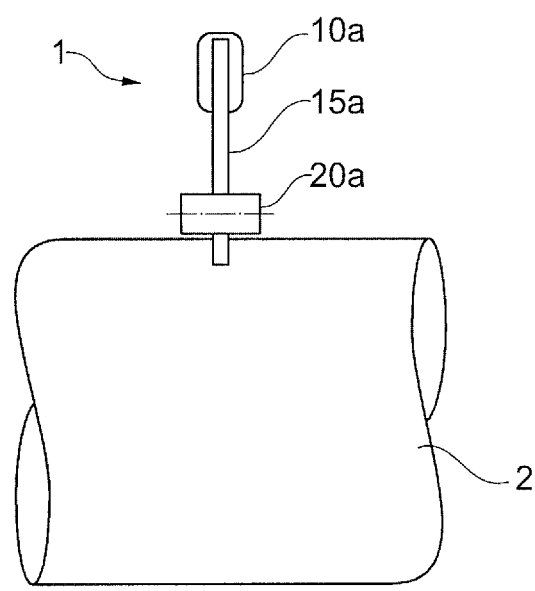
FIG. 2 illustrates a contactless force measurement sensor according to a further exemplary embodiment of the invention.

FIG. 2 illustrates a side view of the contactless force measurement sensor shown in FIG. 1.

The longitudinal direction of the first magnetic field detector unit runs along the longitudinal direction of the object to be sensed wherein the connecting line between the poles of the flux concentrator runs into or out of the plane of drawing.

Figure 3:
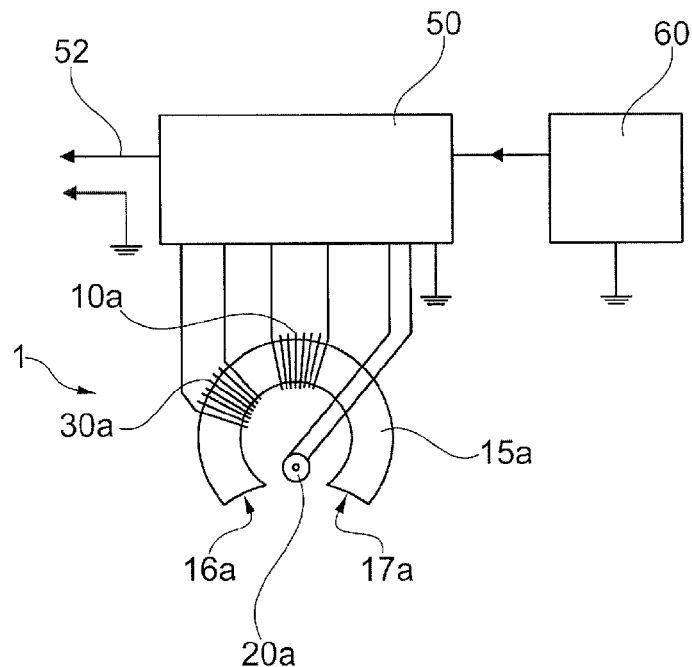
FIG. 3 illustrates a contactless force measurement sensor according to a further exemplary embodiment of the invention.

FIG. 3 illustrates a schematic overview of a contactless force measurement sensor 1, wherein the first magnetic field generating unit 10a and the feedback element 30a as well as the first magnetic field detector unit 20a are connected to the evaluating unit which on the one hand generates the signal transmitted to the first magnetic field generating unit for generating the magnetic field and senses the signal transmitted by the feedback element and the first magnetic field detector unit for determining the mechanical force applied to the object to be sensed.

The evaluating unit 50 receives electrical power from the power supply 60 and provides the output signal which indicates the force applied to the object to be sensed at the output line 52.

The Sensor consists of two main modules: the actual sensing element (built by using passive electronic components), and the sensor electronics. Both modules can be placed together in the same housing, but can also be placed separately from each other, only connected to each other by a number of wires, for example wires of a length up to a few meters, in particular between 1 m and 5 m, an in particular 2 m.

The contactless force measurement sensor consists of several modules: sensor hardware (flux concentrator, generator coil, feedback coil, detector coil); an electronic circuit of the evaluating unit; a six lead connection cable or line between the sensor hardware and the electronics of the evaluating unit; a power supply and a two lead connection cable or line between the electronics and the power supply.

A complete and single sensing element consists of all the components shown above. The feedback coil is optional and may be required only when any potential spacing changes between the object to be sensed and the contactless force measurement sensor has to be compensated automatically. The function of the feedback coil may be used only when driving the field generator coil with an AC driver signal. When using a DC current driver signal, the automatic space compensation feature may not be realized by the feedback coil.

The optional feedback coil is used to detect and measure the spacing or the gap between the contactless force measurement sensor and in particular the flux concentrator and the surface of the object to be sensed. The signal measured with this coil will be used to compensate for the unwanted signal amplitude modulation caused when the spacing between the object to be sensed and the contactless force measurement sensor keeps changing. In application where the spacing is not changing, the feedback coil may not be required. The feedback coil provides precise information about the sensor efficiency or when the spacing between the sensor hardware and the surface of the object to be sensed is changing.

Figure 4:
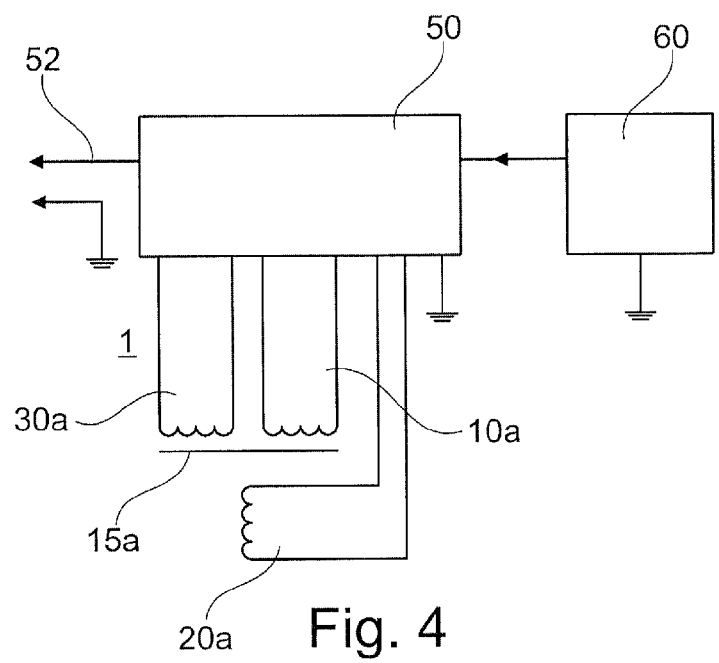
FIG. 4 schematically illustrates a contactless force measurement sensor according to a further exemplary embodiment of the invention.

FIG. 4 illustrates a schematic overview of the basic electrical interconnection of the components of the contactless force measurement sensor 1 as shown in FIG. 3.

The field generator coil or primary inductor 10a and the feedback coil or secondary inductor 30a are placed on the same flux concentrator. Signals generated by the field generator coil can be detected and measured by the feedback coil. The signal transfer function may be influenced by the distance between the flux concentrator and the surface of the object to be sensed. The smaller the air gaps are between the two poles of the flux concentrator ends and the surface of the object to be sensed, the more efficient is the magnetic transfer between the primary and secondary coils. This relationship may not be strictly proportional and may have to be linearized by the sensor electronics, which will be explained in more detail below.

Figure 5:
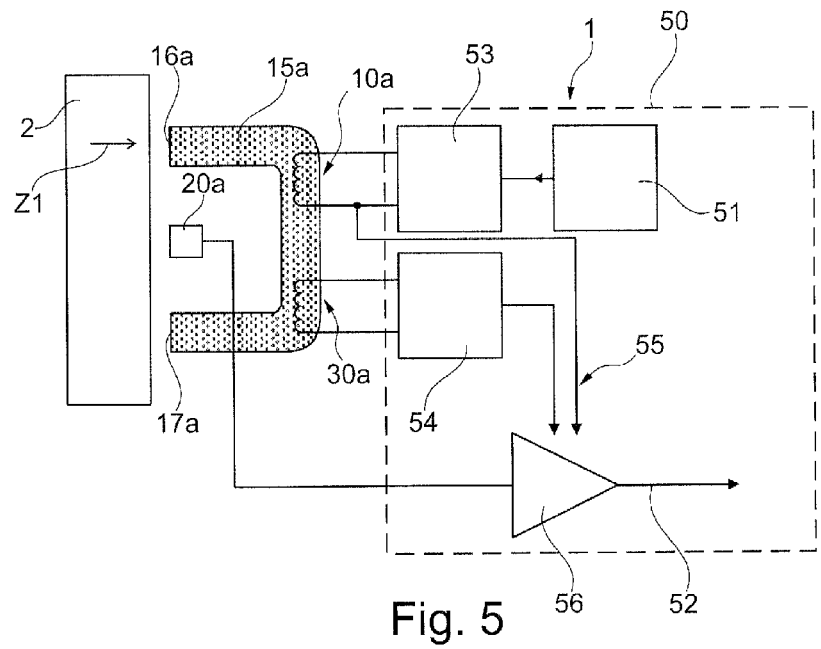
FIG. 5 schematically illustrates a contactless force measurement sensor according to a further exemplary embodiment of the invention.

FIG. 5 illustrates a contactless force measurement sensor with a detailed illustration of the evaluating unit 50 which comprises a signal generator 51 and a filter and power driver 53, both for driving the first magnetic field generating unit 10a, and a filter and gain unit 54 for receiving the signal from the feedback element 30a.

The signal gain control information 55 generated out of the generating signal of the first magnetic field generating unit 10a and the signal detected by the feedback element 30a is used together with the signal provided by the first magnetic field detector unit 20a to generate the output signal 52 by the variable gain amplifier 56. Thus, the variable gain amplifier 56 provides a compensated output signal 52 as the signal from the feedback element is taken into account when calculating the output signal.

A change in the distance between the flux concentrator and the object to be sensed will cause an amplitude change of the signal measured by the feedback coil 30a. The signal amplitude information from the field generator coil 10a and the feedback coil 30a will allow a variable gain amplifier to correct the otherwise changing bending signal amplitude. In this example, it may be necessary to linearize the feedback coil signal first before passing it on to the variable gain amplifier.

Figures 6A, 6B:
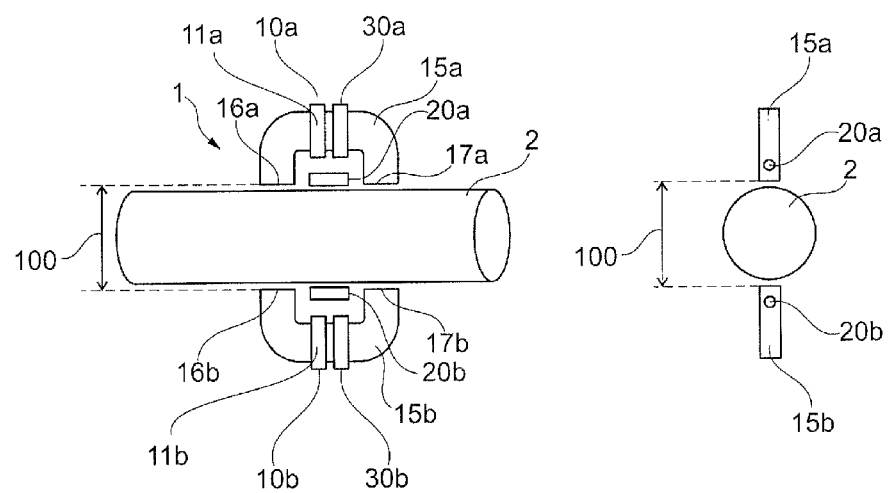
FIG. 6A illustrates a contactless force measurement sensor according to a further exemplary embodiment of the invention.
FIG. 6B illustrates a contactless force measurement sensor according to a further exemplary embodiment of the invention.

FIG. 6A illustrates a contactless force measurement sensor 1 having a first sensing unit a and a second sensing unit b, which are identical sensing elements each having a magnetic field generating unit 10a, 10b consisting of a generating coil 11a, 11b, a flux concentrator 15a, 15b having two poles 16a, 17a, 16b, 17b, and a magnetic field detector unit 20a, 20b.

The first sensing unit and the second sensing unit are arranged oppositely with respect to each other having the object to be sensed 2 in between them, wherein the first sensing unit and the second sensing unit are spaced apart having the distance 100 in between them and in particular in between the poles of the flux concentrator of the first sensing unit and the second sensing unit.

The longitudinal extension of the first magnetic field detector unit 20a and of the second magnetic field detector unit 20b extends parallel to the longitudinal direction of the object to be sensed and parallel to the connecting line between the poles of the flux concentrator of each of the first sensing unit and the second sensing unit. This means, that the flux concentrator is arranged with respect to the object to be sensed such that the connecting line of the poles rims parallel to the longitudinal axis of the object to be sensed.

FIG. 6B illustrates a side view of the diagram shown in FIG. 6A. The connecting line of the poles of the flux concentrators, the longitudinal axis of the object to be sensed and the longitudinal axis of the first magnetic field detector unit run into or out of the plane of drawing.

Alternatively to the embodiment shown in FIGS. 6A and 6B, the first magnetic field detector unit and the second magnetic field detector unit may be arranged such that the longitudinal direction of the respective detector coil runs perpendicular to the connecting line of the poles of the flux concentrator and to the longitudinal direction of the object to be sensed.

Having a first sensing unit and a second sensing unit enables a differential measurement mode.

In order to differentiate between the targeted bending force, i.e. in case the bending force applied to the object to be sensed is the force to be measured, and other mechanical forces, like torque forces, two similar or identical looking sensing units are placed symmetrically at either side of the object to be sensed. By subtracting the measured signals of the first sensing unit and the second sensing unit from each other, the potentially present torque forces will be canceled, and what remains are the bending forces intended to be measured.

The mathematical processing of the two signals (one from each individual sensing element) can be done in different ways: connecting the magnetic field sensing coils to each other in reversed order (connecting them in series in such way that the measured signals are subtracted from each other without any use of active electronics); feeding the individual and conditioned measurement signals to an analogue working summing circuit in order to subtract the signals from each other; using a digital processing system (like a microprocessor) to execute the mathematical signal processing, which may be the most flexible solution.

When choosing the first proposed solution (connecting the passive magnetic field sensing coils in series) then it may be necessary to ensure that the signal amplitudes and signal offsets from each sensing coil are matched to each other. Otherwise, the resulting signal may include cross-talk and may be distorted (in relation to the targeted output signal).

Figure 7:
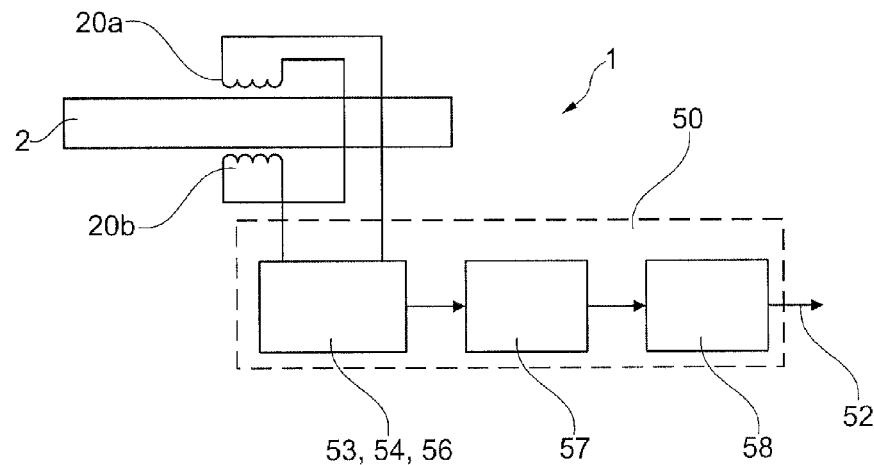
FIG. 7 schematically illustrates a contactless force measurement sensor according to a further exemplary embodiment of the invention.

FIG. 7 illustrates a schematic overview of the electrical interconnection when using the differential measurement mode. The signals of both the first magnetic field detector unit 20a and the second magnetic field detector unit 20b are detected and lead to the evaluating unit 50, wherein the signals are processed or directed to an AD converter 57 and a micro controller unit 58 in order to generate the output signal 52.

In case the first magnetic field detector unit and the second magnetic field detector unit are of identical specifications with regard to inductivity and physical dimensions, the coils can be connected to each other in series, but one may be connected in reverse order which allows that the signals measured in the first magnetic field detector unit and in the second magnetic field detector unit will be subtracted from each other before the signal will be fed into the signal conditioning and signal processing module of the evaluating unit 50.

Figures 8A, 8B:
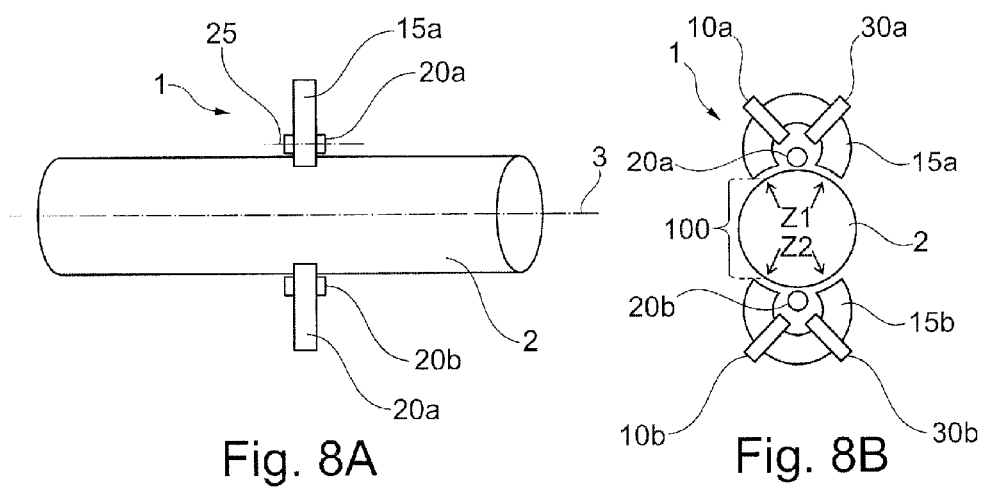
FIG. 8A illustrates a contactless force measurement sensor according to a further exemplary embodiment of the invention.
FIG. 8B illustrates a contactless force measurement sensor according to a further exemplary embodiment of the invention.

FIGS. 8A and 8B illustrate a contactless force measurement sensor similar to that shown in FIGS. 6A and 6B, wherein in contrary to FIGS. 6A and 6B the flux concentrator of the first magnetic field generating unit and of the second magnetic field generating unit is rotated 90° such that the connecting line of the poles of each of the flux concentrators is perpendicular with respect to the longitudinal axis 3 of the object to be sensed 2 and the longitudinal axis 25 of the first magnetic field detector unit and of the second magnetic field detector unit.

The contactless force measurement sensor 1 shown in FIGS. 6A, 6B, 7, 8A, and 8B is designed for differential mode measurement.

FIGS. 9A and 9B illustrate a contactless force measurement sensor comparable to that one shown in FIGS. 6A and 6B but having just one sensing unit instead of two sensing units for differential measurement. The first magnetic field detector unit 20a is arranged such that its longitudinal direction extends perpendicular to the connecting line of the poles or longitudinal direction 27 of the flux concentrator 15a and the longitudinal direction of the object to be sensed, wherein the longitudinal direction 27 runs parallel to the longitudinal direction of the object to be sensed.

FIGS. 10A and 10B illustrate a contactless force measurement sensor having one sensing unit, wherein the connecting line between the poles of the flux concentrator are perpendicular to the longitudinal direction of both the first magnetic field detector unit and the object to be sensed, which in turn are parallel to each other.

The first magnetic field detector unit and the second magnetic field detector unit can be either an inductor with core, hall-effect sensor, MR, GMR, or any other magnetic field device that is suitable for the desired measurement range. The orientation of the longitudinal axis of the magnetic field detector units in relation to the magnetic flux lines, i.e. the connecting line between the two poles of the flux concentrator, is important with regard to the force to be measured and will be explained in detail below.

Using a single sensing unit as shown in FIGS. 9A, 9B, 10A, and 10B may reduce the cost and makes the contactless force measurement sensor smaller with regard to the physical dimensions. However, by doing so it will not be possible to differentiate between applied bending forces and the potentially available other mechanical forces, like torque or bending in another axis. Meaning, when using a single sensing cell structure or sensing unit, the sensor module may pick up several different mechanical forces acting in different directions and having more than one direction component at the same time without any possibility to differentiate between them.

One way for using a single cell bending sensor, i.e. having just one sensing unit, can be when the object to be sensed has been built and mounted in its application in such way, that only the mechanical forces to be measured travel through it. Meaning that there will be no interfering mechanical forces present.

Figure 11:
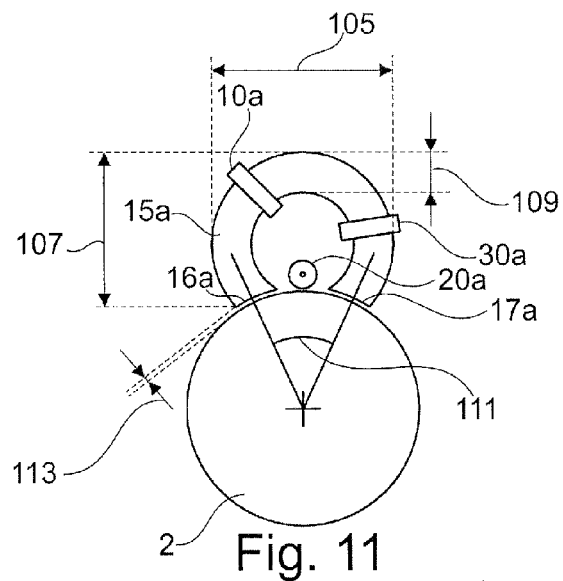
FIG. 11 illustrates a contactless force measurement sensor according to a further exemplary embodiment of the invention.

FIG. 11 illustrates a contactless force measurement sensor 1 and elucidates the physical dimensions of the contactless force measurement sensor.

The flux concentrator 15a has a length 105 in a direction of the connecting line between the poles 16a, 17a, a height 107 in a direction orthogonally to the surface of the object to be sensed when being placed on that surface, and a material thickness 109, i.e. a diameter or width of the material of the flux concentrator. The flux concentrator 15a and in particular the poles 16a, 17a of the flux concentrator have an aperture angle 111 which corresponds the angle in radial direction of the object to be sensed between the directions perpendicular to the center of the surfaces of the poles.

The contactless force measurement sensor 1 is arranged at a distance 113 between the poles 16a, 17a and the surface of the object to be sensed 2.

Figure 12:
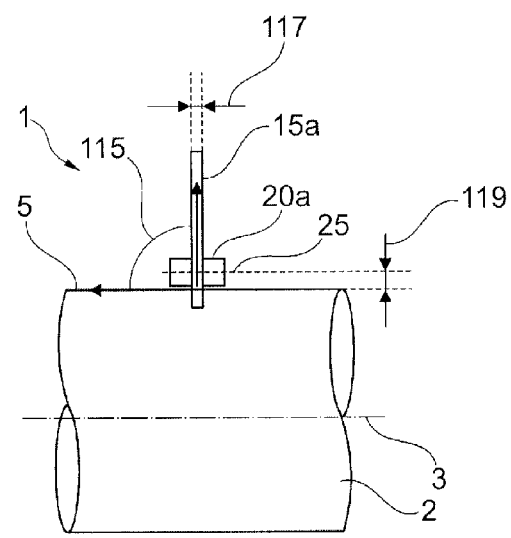
FIG. 12 illustrates a contactless force measurement sensor according to a further exemplary embodiment of the invention.

FIG. 12 illustrates a side view of the contactless force measurement sensor shown in FIG. 11.

The flux concentrator 15a has a width 117 in a direction parallel to the longitudinal direction 3 of the object to be sensed and is inclined at the angle 115 with respect to the surface of the object to be sensed, i.e. the angle 115 is between the direction of extension of the flux concentrator on the surface of the object to be sensed and the longitudinal axis 3 of the object to be sensed.

The first magnetic field detector unit 20a is arranged space apart from the surface of the object to be sensed 2 such that the longitudinal axis 25 of the first magnetic field detector unit 20a and the surface 5 of the object to be sensed 2 are arranged at the distance 119 with respect to each other.

Figure 13:
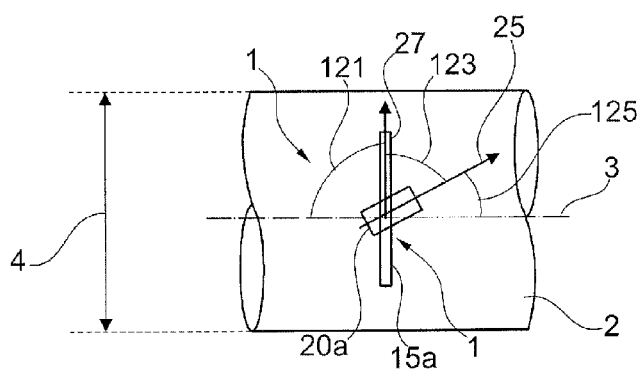
FIG. 13 illustrates a contactless force measurement sensor according to a further exemplary embodiment of the invention.

FIG. 13 illustrates a top view of the contactless force measurement sensor shown in FIG. 11, wherein the arrangement of the longitudinal axis of the first magnetic field detector unit 20a, the longitudinal direction 3 of the object to be sensed 2 and the connecting line of the poles of the flux concentrator with respect to each other are shown.

The longitudinal axis 25 of the first magnetic field detector unit is inclined with respect to the longitudinal axis 3 enclosing the angle 125 and the angle 123 between the longitudinal axis 25 and the connecting line of the poles of the flux concentrator.

Thus, the sum of the angles 123 and 125 correspond to the angle 121 between the connecting line of the poles of the flux concentrator and the longitudinal axis 3 of the object to be sensed 2.

The angles 121, 123, 125 and in particular the angle 123 decide about what mechanical force will be measured and about what the quality of the measured signal will be. This angle also decides about potential cross-talk in the measured signal will be caused by the different mechanical forces that may applied to the object to be sensed.

The following table gives an exemplary overview of the physical dimensions of the contactless force measurement sensor.

| Specification | Ref. Sign | Min | typical | Max | Unit |
| --- | --- | --- | --- | --- | --- |
| Flux Concentrator Length | 105 | | 22 | | mm |
| Flux Concentrator Height | 107 | | 20 | | mm |
| Flux Concentrator Thickness | 117 | | 4 | | mm |
| Flux Concentrator Channel Thickness | 109 | | 2.5 | | mm |
| Flux Concentrator Tilting | 115 | −1 | | +1 | degree |
| Flux Concentrator Pole Opening Angle | 111 | | 60 | | degree |
| Angle axis to Generator Field Axis | 123 | | 88 | | degree |
| Flux Concentrator Material | | | Washer Steel | | |
| Number of Metal Elements used in FC | | 1 | 3 | | |
| Spacing: FC Poles and Test Object | 113 | 0.1 | | 1.1 | mm |
| Distance Centre MFS Coil to Test Object | 119 | | 2 | | mm |
| Test Object Diameter | | 4 | 15 | | mm |
| Generator Coil Number of Turns | | | 100 | | Windings |
| Coil wire thickness | | | 0.28 | | mm |
| Axial Coil Length on FC | | | 10 | | mm |
| Location in respect of the FC | | | Centre | | |
| MFS Coil Specification: Turns | | | 400 | | Windings |
| MFS Coil Wire Thickness | | | 80 | | μm |
| Coil Body length | | | 6 | | mm |
| MFS Coil Body Diameter | | | 2 | | mm |
| MFS Coil Resistivity | | DC Current | 10 | | Ohm |
| MFS Coil Manufacturer | | | KUK | | |

FIG. 14 illustrates a contactless force measurement sensor 1 comprising a first magnetic field generating unit 10a in form of a coil wound around the flux concentrator 15a, and further comprising a first magnetic field detector unit arranged in between the poles 16a, 17a of the flux concentrator.

FIG. 15 illustrates a side view of the contactless force measurement sensor shown in FIG. 14, wherein the longitudinal axis of the first magnetic field detector unit extends parallel to the longitudinal axis of the object to be sensed and perpendicular to the connecting line between the poles of the flux concentrator 15a.

FIGS. 16A, 16B, 16C illustrate a contactless force measurement sensor 1 together with an object to be sensed 2 having diverging physical dimensions, i.e. diverging shaft diameter 4.

The diameter 4 of the test object or drive shaft is important for the bending forces related signal gain. The larger the diameter of the shaft will be, the smaller the signal gain will become (in relation to a constant Bending force that will be applied to the shaft).

The bending sensor signal gain is defined by a number of specific specifications which may be used in an assignment step to assign a predetermined force to a resulting output signal, i.e. for calibrating the contactless force measurement sensor and the evaluating unit. When trying to reconfirm the sensors behavior when the test object diameter (or cross section area) will be changed, then all of the other sensor parameters have to be kept constant, like: identical shaft material; identical hardening and annealing process; identical spacing or gap between the test object and the sensor hardware; identical magnetic flux density generated by the sensor hardware; identical inductivity and driver circuit; identical sensor hardware dimensions; identical surface area of the two magnetic poles.

When using objects to be sensed with different diameters, the radius cut into the poles to match the shaft diameter or shaft surface may be adapted as to be concave in the same way the surface of the shaft is convex.

Figures 17A, 17B, 17C:
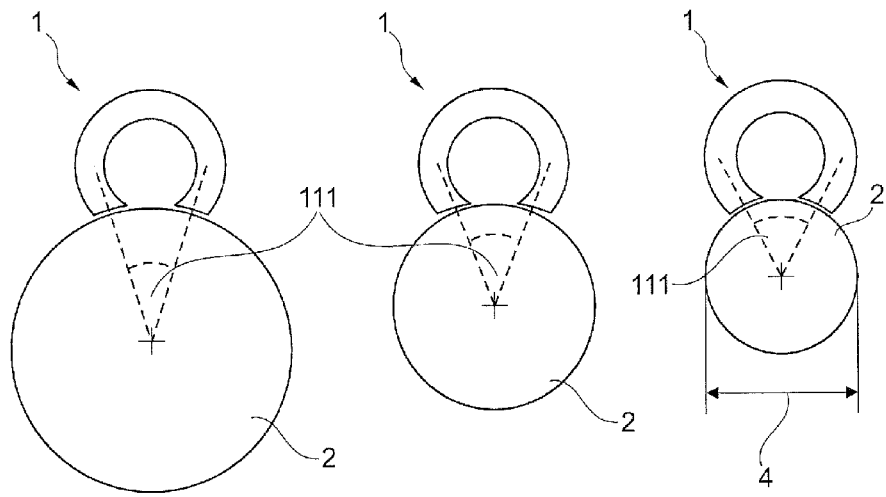
FIG. 17A schematically illustrates a contactless force measurement sensor according to a further exemplary embodiment of the invention.
FIG. 17B schematically illustrates a contactless force measurement sensor according to a further exemplary embodiment of the invention.
FIG. 17C schematically illustrates a contactless force measurement sensor according to a further exemplary embodiment of the invention.

FIGS. 17A, 17B, 17C illustrate a contactless force measurement sensor 1 having different aperture angles 111 of the flux concentrator dependent on the diameter 4 of the object to be sensed 2.

The bending sensor signal gain may also be defined by the arch specification of the sensor hardware, i.e. the aperture angle 111 of the flux concentrator. Arch specification means here: the angle with which the sensor hardware is covering the test object.

The aperture angle 111 of the flux concentrator is different in all of the three examples shown in FIGS. 17A, 17B, and 17C. There are two assumptions which may exist both and to some extend compensate each other: the larger the aperture angle 111, the larger the signal gain will be; with a larger aperture angle 111, a larger area of the surface of the object to be sensed will be covered and will make it easier to detect the under torque forces twisting magnetic signal; the closer the two magnetic poles of the flux concentrator will come to the opposing shaft sides (i.e. the greater the aperture angle will be), the smaller the sensor signal will become.

In the latter case (when the poles are placed to opposing shaft sides) the magnetic field will now travel almost 100% directly through the shaft material and will not show any effects on the shaft surface (where the sensing coil is placed) and will not lead to a detectable induced current to the first magnetic field detector unit.

In one exemplary embodiment, the flux concentrator may comprise two elements interconnected via a hinge or a flexible part to each other such that the inclination of the two parts to each other and the aperture angle 111 may be changed or adjusted to a varying diameter of the object to be sensed.

Figures 18A, 18B:
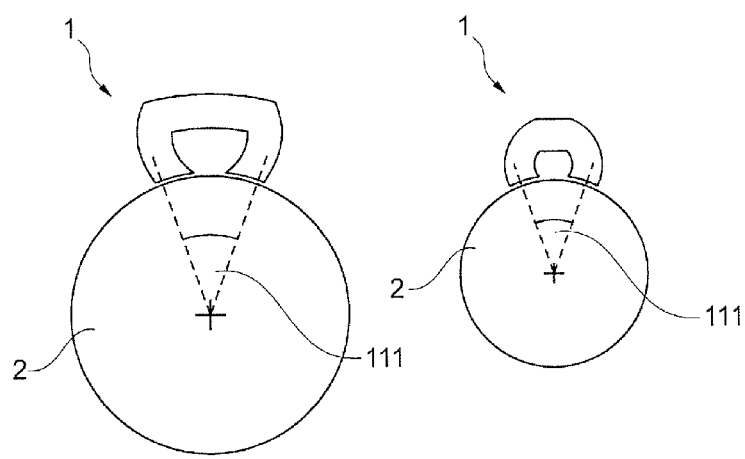
FIG. 18A schematically illustrates a contactless force measurement sensor according to a further exemplary embodiment of the invention.
FIG. 18B schematically illustrates a contactless force measurement sensor according to a further exemplary embodiment of the invention.

FIGS. 18A and 18B illustrate a flux concentrator of a contactless force measurement sensor having the same aperture angle 111 in connection with different diameters of the object to be sensed.

In these drawings, the shaft diameter is changing and the angle of the arch is being kept constant. This means that the sensor hardware design will change substantially for each shaft diameter.

The following table gives an overview of the physical dimensions and the requirements by means of three exemplary configurations.

Figure 19:
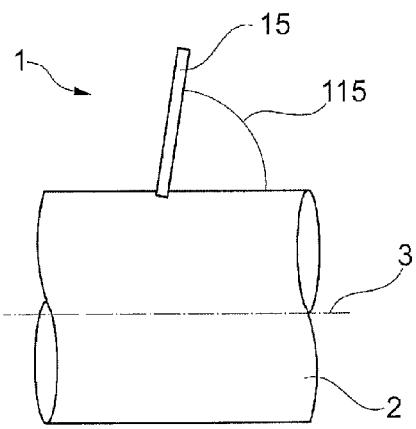
FIG. 19 schematically illustrates a contactless force measurement sensor according to a further exemplary embodiment of the invention.

FIG. 19 illustrates a contactless force measurement sensor 1 tilted with respect to the surface of the object to be sensed 2 such that the angle 115 differs from 90°. Such a tilted flux concentrator may influence the signal gain of the first magnetic field detector unit.

Figure 20:
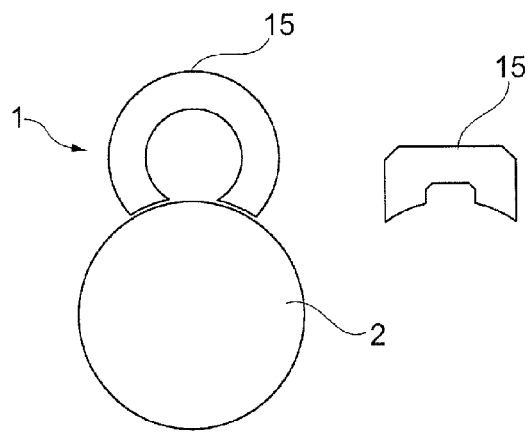
FIG. 20 schematically illustrates a contactless force measurement sensor according to a further exemplary embodiment of the invention.

FIG. 20 illustrates a contactless force measurement sensor 1 with alternative flux concentrator profile.

One profile of the flux concentrator is a circular one, wherein the other one of the profiles is a flattened one and reduces the physical dimensions of the flux concentrator, in particular the height 107.

A flattened or low profile mechanical design as shown on the right side of FIG. 20 may be preferred in most applications due to its lower proportions or physical dimensions. However, it may be necessary to ensure that there are no sharp corners left at the flux concentrator as the magnetic field and the magnetic field lines may escape or leave the flux concentrator there and generate unwanted stray fields.

It may also be important to ensure that the top part of the flux concentrator is not getting too close to the surface of the test object as otherwise that part of the flux concentrator will interfere with the measurement signal (i.e. will distract or deflect the magnetic signal that should be detected and captured by the first magnetic field detector unit).

A reduced space in radial direction of the object to be sensed for the sensor may help fitting the sensor into small spaces. However, by reducing the radial dimensions the generator coil will come closer to the sensing coil and closer to the test object surface which may start to interfere with the otherwise achievable sensor performance.

Figure 21:
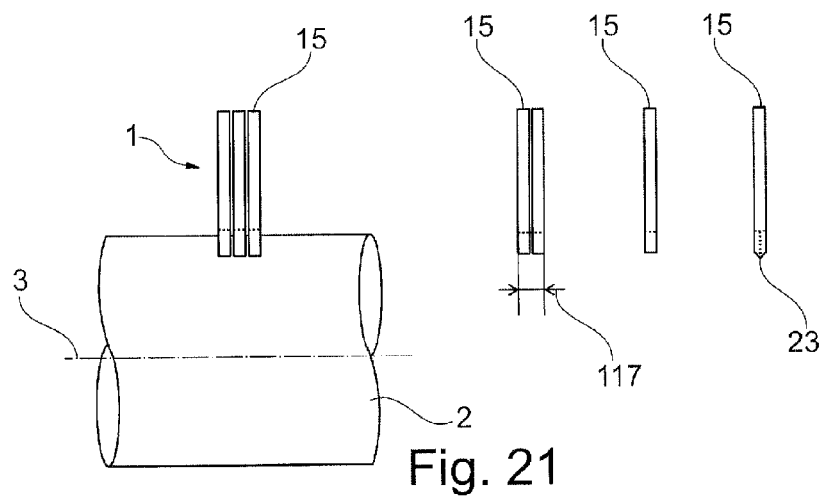
FIG. 21 schematically illustrates a contactless force measurement sensor according to a further exemplary embodiment of the invention.

FIG. 21 illustrates a contactless force measurement sensor having varying material thickness 117, which may be provided for example by placing similar flux concentrators behind each other.

Further, FIG. 21 shows that the surface 23 of the poles of the flux concentrator may be geometrically adapted, for example sharpened or pointed.

The thickness 117 of the flux concentrator may define the precision a specific mechanical force can be selectively identified and measured. It may have an influence at the measuring accuracy that the magnetic flux lines generated will be channeled through the surface of the test object to assure sufficient signal amplitude, generated by the magnetic field sensing device. When making the flux concentrator to thin then the field generated by the field generator coil may create unwanted magnetic stray fields.

To get the pole surface very slim, the pole end can be sharpened. The potential benefit is that such a design will be less sensitive to the tilting of the flux concentrator, i.e. insensitive to an inclination as shown in FIG. 19, wherein the angle 115 is less than 90°.

| Specification | Explanation | Example 1 Typical | Example 2 Typical | Example 3 Typical | Unit |
|---|---|---|---|---|---|
| Smallest usable shaft diameter | | 20 | 12 | 10 | mm |
| Largest usable shaft diameter | | 50 | 100 | unlimited | mm |
| Signal Resolution | Equivalent in digital Bits | 8 | 10 | 12 | Bit |
| Repeatability | As a percentage of Full Scale | +/−1 | +/−0.5 | +/−0.1 | % of FS |
| Signal Bandwidth | Analogue Hz | 100 | 1,000 | 10,000 | Hz |
| Signal Hysteresis | when using Ferro-Magnetic material | +/−2 | +/−0.5 | +/−0.2 | % of FS |
| Output Signal Range | Max negative to max positive Torque | 1.5 | 2 | 4 | V |
| Signal-to-Noise | | 10 | 5 | <2.5 | mV |
| Air Gap Variation | Sensor to Shaft Surface Variation | none | 1.5 | 4 | mm |
| Sensor Hardware Height | Radial Spacing required for 25 mm shaft | 25 | 20 | <15 | mm |
| Electric Current Consumption | | <250 | <125 | <75 | mA |
| Operating Temperature Range | Sensor Hardware only | 0 to +70 | −20 to +85 | −40 to +150 | deg C. |

LIST OF REFERENCE SIGNS 1 contactless force measurement sensor
2 object to be sensed
3 longitudinal axis of the object to be sensed
4 width/diameter of the object to be sensed
5 surface of the object to be sensed
10a, 10b first/second magnetic field generating unit
11a, 11b magnetic field generating element
15a, 15b flux concentrator
16a, 17a first/second pole
16b, 17b first/second pole
20a, 20b first/second magnetic field detector unit
23 surface of the first and second pole
25 longitudinal axis of the magnetic field detector unit
27 longitudinal direction of the flux concentrator
30a, 30b feedback element
50 evaluating unit
51 signal generator
52 output signal
53 filter and power driver
54 filter and gain
55 signal gain control information
56 variable gain amplifier
57 AD-converter
58 micro controller unit
60 power supply
100 distance between two oppositely arranged flux concentrators
105 length of the flux concentrator
107 height of the flux concentrator
109 material thickness/diameter of the flux concentrator
111 aperture angle of the flux concentrator
113 distance between flux concentrator and object to be sensed
115 angle between (the vertical direction of the) flux concentrator and the (longitudinal axis 3 of the) object
117 width of the flux concentrator in direction of the longitudinal axis 3
119 distance between the surface 5 and the longitudinal axis 25
121 angle between the longitudinal direction of the flux concentrator and the longitudinal axis of the object to be sensed
123 angle between the longitudinal direction of the flux concentrator and the longitudinal axis of the magnetic field detector
125 angle between the longitudinal axis of the magnetic field detector and the longitudinal axis of the object to be sensed
z1, z2 first/second facing orientation

The invention claimed is:

1. A contactless bending force measurement sensor for measuring an applied bending force onto an object, comprising:
a first facing orientation defining an orientation pointing towards a surface of the object;
a first magnetic field generating unit generating a magnetic field towards the facing orientation, the first magnetic field generating unit including a magnetic field generating element and a flux concentrator, the flux concentrator cooperating with the magnetic field generating element so as to concentrate the generated magnetic field towards the facing orientation, the flux concentrator having a U-shape and including a first pole and a second pole, the first and second poles being oriented in a direction of the facing orientation;
a first magnetic field detector unit detecting a first magnetic field, the first magnetic field being generated by the first magnetic field generating unit and being influenced by an applied force to be measured, the first magnetic field detector unit outputting a first signal which is representative of the detected magnetic field, the first magnetic field detecting unit including a coil, the coil being situated between the first pole and the second pole, the coil being oriented in a direction corresponding to a connection line between the first pole and the second pole, a longitudinal axis of the coil extend in a direction from the first pole to the second pole;
an evaluating unit evaluating a signal strength of the first signal and determining the applied force based on the first signal; and
at least one feedback element connected to the evaluation unit and providing a comparative signal, the evaluation unit compensating a varying distance between the contactless force measurement sensor and the object as a function of the comparative signal.

2. The sensor according to claim 1, further comprising:
a second facing orientation defining an orientation pointing towards the surface of the object;
a second magnetic field generating unit generating a magnetic field towards the second facing orientation; and
a second magnetic field detector unit detecting a second magnetic field, the second magnetic field being generated by the second field generator unit and being influenced by an applied force to be measured, the second magnetic field detector unit outputting a second signal being representative for the detected magnetic field,
wherein the evaluating unit is evaluating a signal strength of the first signal and the second signal and determining the applied force based on the first signal and the second signal.

3. The sensor according to claim 2, wherein the evaluating unit determines the applied force as a function of difference between the first signal and the second signal.

4. The sensor according to claim 2, wherein at least one of the first and second magnetic field generating units generates a magnetic field which is being a combination of a permanent magnetic field and a magnetic field having an alternating frequency.

5. The sensor according to claim 2, wherein the second facing orientation oppositely faces the first facing orientation, and having a distance between the first magnetic field generating unit and the first magnetic field sensing unit on the one hand and the second magnetic field generating unit and the second magnetic field sensing unit on the other hand for receiving an object onto which an applied force is to be measured.

6. The sensor according to claim 2, wherein the sensor measures bending forces, the evaluation unit evaluating the first and second signal and to determine a bending force based on the first and second signal.

7. The sensor according to claim 1, wherein the coil is offset to a connection line between the first pole and the second pole.

8. A sensing arrangement, comprising:
a contactless force measurement sensor according to claim 1; and
an elongated object,
wherein a longitudinal extension of the magnetic field generating unit is substantially parallel with a longitudinal extension of the elongated object.

9. A sensing arrangement, comprising:
a contactless force measurement sensor according to claim 1; and
an elongated object,
wherein a longitudinal extension of the magnetic field generating unit is substantially traverse to a longitudinal extension of the elongated object.

* * * * *